May 19, 1953     D. B. HARRIS     2,639,422

FORWARD RADAR ECHO-RANGING METHOD AND SYSTEM

Filed March 8, 1949     7 Sheets-Sheet 1

Fig. 1.

SOLID LINES = $\dfrac{\delta(2D+\delta)}{2[D(1-\cos\theta)+\delta]}$

DOTTED LINES = $\dfrac{\delta}{1-\cos\theta}$

Fig. 3.

INVENTOR.
DONALD B. HARRIS
BY
John J. Rogan
ATTORNEY

INVENTOR.
DONALD B. HARRIS

Patented May 19, 1953

2,639,422

UNITED STATES PATENT OFFICE 2,639,422

FORWARD RADAR ECHO-RANGING METHOD AND SYSTEM

Donald B. Harris, Cedar Rapids, Iowa, assignor to Collins Radio Company, Cedar Rapids, Iowa, a corporation of Iowa Application March 8, 1949, Serial No. 80,204

20 Claims. (Cl. 343—11)

This invention relates to wave propagation systems, and more especially to systems for scanning a region of space by high frequency radio waves.

A principal object of the invention is to provide a novel method and organization of apparatus for radio echo ranging by forward transmission, as distinguished from the conventional radar systems wherein the included angle between the transmitted and reflected waves is very small.

Another principal object is to provide a novel method and organization of apparatus for detecting the location of irregularities in a propagation path between two points in space which are widely separated geographically.

Another object is to provide a novel method and organization of apparatus for detecting targets, such for example as atmospheric irregularities, which have a relatively low value of reflection coefficient at normal angles of incident waves, and which are substantially transparent to normal conventional radar beams when such beams impinge thereon and are detected at a small angle of reflection.

Another object is to provide a "forward radar" echo-ranging system wherein the radar transmitter and radar receiver are located at a great distance from each other, and having means to provide a range indication signal for a target located in the propagation path between the transmitter and receiver, which signal is approximately equal to the difference in length of the direct path to the receiver and the reflected path to the receiver divided by the versine of the elevational angle of the arriving signal at the receiver.

Another object is to provide a novel system for producing, under control of a "forward radar" beam, a visual display representing the profile of a propagation path between the transmitter and receiver in any desired plane passing through the transmitter and receiver.

A feature of the invention relates to a "forward radar" echo-ranging system wherein the receiver has means for producing a range signal voltage representing not only the difference in path length of the direct and reflected waves, but also the angle of arrival of the reflected waves at the receiver.

Another feature relates to a "forward radar" echo-ranging system wherein the transmitter and receiver are located at points widely spaced geographically and between which a target is located for detection; and including means at the receiver to set up a sweep voltage representing an ellipsoidal locus of points in the propagation paths having the same ratio of $$\frac{\delta}{D}$$

wherein $\delta$ equals the difference in length between the direct path between transmitter and receiver, and the reflected path between the transmitter and receiver, and D equals the direct distance between the transmitter and receiver.

Another feature relates to a "forward radar" echo-ranging system wherein the transmitter and receiver are located at points widely spaced geographically and between which a target is located for detection; and including means at the receiver to set up a sweep voltage representing an ellipsoidal locus of points in the propagation paths having the same ratio of $$\frac{\delta}{D}$$

wherein $\delta$ equals the difference in length between the direct path to the receiver and the echo or reflected path to the receiver, and D equals the direct distance between the transmitter and receiver. At the same time, the sweep voltage at the receiver is also determined by the angle of elevation of the receiving antenna.

A further feature relates to a "forward radar" echo-ranging system wherein a radar transmitter sets up a radar field in the region of space where a target is to be detected, and a radar receiver located at a distant point has an antenna which responds to the waves reflected from the target, the antenna being of adjustable elevation. Connected to the receiving antenna is an oscilloscope having a plurality of beam deflecting systems, one of which is energized by a voltage $$x = D - \frac{\delta}{\sec\theta - 1}$$

and $$y = \frac{\delta \tan 1}{\sec\theta - \theta}$$

wherein $\delta$ equals the difference between the length of the direct path between transmitter and receiver and the echo or reflected path from the transmitter to receiver, and $\theta$ equals the angle of elevation of the receiving antenna.

A still further feature relates to the novel organization, arrangement and relative location and interconnection of parts which cooperate to provide a novel and effective system of forward radar echo ranging.

Other features and advantages not particularly enumerated, will be apparent after a consideration of the following detailed descriptions and the appended claims.

In the drawing,

Fig. 2 is a series of graphs showing the locus of points in various propagation paths having the same ratio $$\frac{\delta}{D}$$

where $\delta$ is the difference in path length between the direct and the reflected or refracted waves, and D is the distance between the transmitter and receiver.

As a result of certain propagation studies, at a nominal frequency of 400 megacycles there has been revealed the undeniable existence of irregularities of some type in the propagation path, which result in multi-path transmission and variation in signal strength received at distances of 100 and 200 miles, considerably beyond the horizon. Apparently as a result of these irregularities, the field strength observed at the receiving locations is found at times to be as much as 80 decibels higher than that which is predicted by accepted diffraction theory. The particular type of irregularities involved does not appear to fall into the category of "ducts," the mechanism of which is fairly well known, as such ducts have also been observed, and are found to produce an entirely different indication. In the case of ducts a fairly steady signal is received over a considerable period of time. The irregularities referred to, however, exist at times when ducts appear to be absent, and are characterized by extremely rapid fading. The appearance on the recording instruments is similar to that which would be caused by reflections from a multiplicity of clouds moving at random in the propagation path.

By studying the relation between the received signal strength and the meteorological conditions at the transmitting and receiving sites, it appears that the irregularities are probably relatively small in extent, and quite numerous, being distributed along the length of the propagation path. Under these conditions, observations of meteorological conditions at the ends of the path only can be expected to have only limited usefulness. The compilation of information at other points along the path, and the analysis of the resulting data could be carried out, on a statistical basis, only with the greatest difficulty, in view of the tremendous amount of data required, both as a function of time and of space.

Visual observations have not been found to be fruitful, as the irregularities involved appear to exist even when there is no visual obstruction in the propagation path. It has been theorized that the reflections are caused by atmospheric discontinuities involving changes in temperature, pressure, or water vapor content throughout limited volumes of atmosphere at discrete locations along the propagation path, which cause the observed results by bending or refracting the transmitted wave rather than by reflecting it.

In accordance with this invention, there are used what may be termed "forward radar." Such a procedure provides an instantaneous presentation of the conditions along the entire length of the propagation path, which can be observed to determine the shape and size of the irregularities, and their motion over a period of time, and would eliminate the present tedious, and probably incomplete statistical approach to the problem. Existing radar equipment is incapable of observing the irregularities responsible for the phenomena apparently because when the beam is normal to the surface, the irregularities are completely transparent, and give no echo. On the other hand, they are quite capable of bending a wave received at a point distant from the transmitter, because under these conditions the angles of incidence with the surfaces of the irregularities may be extremely large, even approaching grazing angles if the elevation of the irregularities is small.

The present invention provides an instrumentation system, using radar techniques, capable of displaying, on a P. P. I. indicator, a profile of at least a portion of the propagation path in order to show the instantaneous shape, size and location of irregularities located in the path at any time, and their motion over a period of time. As is well known, the P. P. I. indicator is of the type where azimuth is represented by angular orientation around a central reference point, and range or distance is represented radially as a corresponding distance from that point, i. e., range and bearing are presented as coordinates in the polar form. This, in general, involves a pulsed transmitter at the transmitting site, and a receiver at the distant receiving site adapted to measure the difference in path between a wave received directly from the transmitter and waves reflected from or refracted by irregularities; to indicate the angle of arrival of the reflected or refracted waves; and to apply the resultant information to a sweep circuit and P. P. I. indicator in such a manner as to display the coordinates of the irregularities, with reference to a rectangular frame of reference in which the horizontal axis represents distance along the propagation path and the vertical axis represents elevation.

Such an arrangement also has some usefulness in connection with conventional radar applications. It might, for example, be effective in displaying the location of extremely high-flying aircraft, at distances in excess of the normal range of existing radar equipment. It should also assist in circumventing radar countermeasures strategies depending on the use of non-reflecting target surfaces, due to the larger incident angles involved.

*Form of the display control functions*

A system according to the invention requires display control functions differing extensively from the usual relationships employed in controlling the indicator of a conventional radar set, in which the time interval between the emission of the transmitted pulse and the reception of the echo is a linear function of the distance to the target. Where the transmitter and receiver are not located at the same point, this conventional radar relation no longer applies, and it is shown hereinbelow that as a matter of fact, in this case, the distance from the transmitter to the target is a function not only of the delay time, but also of the angle of arrival of the reflected or refracted wave.

Figure 1:
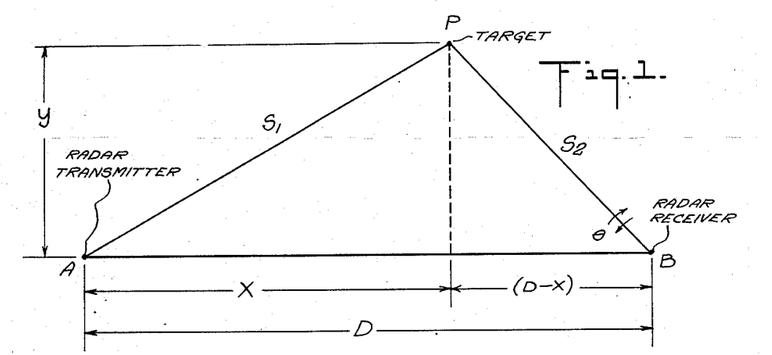
Fig. 1 is a triangulation diagram explanatory of the invention, and representing one particular propagation path profile.

Figure 1 shows a profile of the propagation path, viewed from the side. The transmitter is considered to be located at point A, the receiver at point B, at a distance D from A, and an irregularity exists at point P, the coordinates of which are $x, y$. It is evident that the relation between the slant distance $S_1$ from the transmitter to the irregularity, the slant distance $S_2$ from the irregularity to the receiver, and the distance, D, between the transmitter and receiver is expressed by the equation:

$$S_1 + S_2 = D + \delta \qquad (1)$$

where $\delta$ is the difference in path length between the direct and the reflected or refracted wave. Inspection also shows that:

$$S_1 = \sqrt{X^2 + Y^2} \qquad (2)$$

and:

$$S_2 = \sqrt{(D-X)^2 + Y^2} \qquad (3)$$

relations, which, substituted in (1), give:

$$\sqrt{X^2 + Y^2} + \sqrt{(D-X)^2 + Y^2} = D + \delta \qquad (4)$$

This equation may be manipulated by expansion and collection of terms to give an explicit result for $y$, $$y = \frac{1}{2(D+\delta)} \sqrt{\delta(2D+\delta)[\delta(2D+\delta) - 4x^2 + 4Dx]} \qquad (5)$$

which is recognized as the equation of an ellipse in $x$ and $y$. (If the Z coordinate had also been considered, an ellipsoid of revolution would have been obtained, but it is assumed that the antenna will scan in the vertical $x-y$ plane only). Thus, for a given value of $\delta$ the irregularity may lie anywhere on an ellipse defined by Equation 5, the foci of which are points A and B.

For ease in plotting Equation 5, it may be simplified by substituting the relations, $$\delta = pD \qquad (6)$$

and $$x = qD \qquad (7)$$

to give:

$$y = \frac{D}{2(p+1)} \sqrt{p(p+2)[p(p+2) - 4q^2 + 4q]} \qquad (8)$$

An analysis of Equation 8 shows that:

When $q=0$ or $q=1$ (irregularity directly over transmitter or receiver):

$$y = \frac{pD}{2}\left[\frac{p+2}{p+1}\right] \qquad (9)$$

When $$q = \frac{1}{2}$$

(irregularity at midpoint between transmitter and receiver):

$$y = \frac{D}{2}\sqrt{p(p+2)} \qquad (10)$$

When $y=0$ (irregularity at ground level):

$$q = \frac{p+2}{2} \text{ or } q = -\frac{p}{2} \qquad (11)$$

Figure 2:
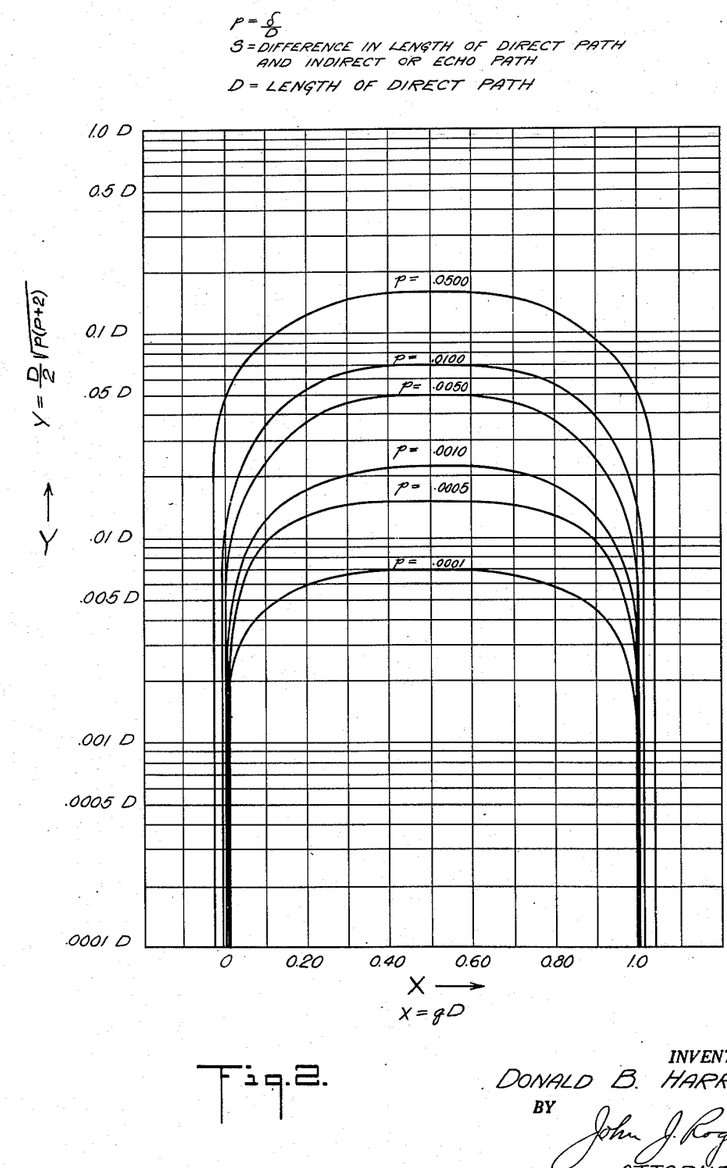

Using these relations a graph of the function is easily obtained, and is shown in Figure 2. It is to be observed from this figure that for any given value of the path difference, $\delta$, or the ratio, $p$, of the path difference to the distance D, the irregularity may be at any elevation from ground level up to a maximum at midpath determined by Equation 10. It is also to be noted that, due to the flattening of the ellipse, all curves are relatively flat for values of $x$ lying between .25D and .75D. The following tabulation, derived from Equation 10, shows the elevation at midpath for various values of $p$ or $\delta$ assuming a baseline, D, of $.5 \times 10^6$ feet, (about 100 miles):

| $p$ | $\delta$ | $y$ |
|---|---|---|
|  | Feet | Feet |
| .0001 | 50 | 3,535 |
| .0005 | 250 | 7,908 |
| .0010 | 500 | 11,183 |
| .0050 | 2,500 | 25,030 |
| .0100 | 5,000 | 35,443 |
| .0500 | 25,000 | 80,040 |

It is immediately apparent from this tabulation that if the irregularities involved lie at low elevations, extremely short pulse lengths and rapid sweeps will be required in order to detect them, at least if they are near the center of the path. For example, the path difference for a midpath elevation of 3,525 feet is seen to be only 50 feet, which represents a time delay of only .0508 microsecond. This is not an insuperable disadvantage, however, as present day techniques make it possible to measure time intervals as small as .01 microsecond. As the elevation of the irregularity increases, the time intervals become disproportionately greater, and no special techniques should be required to measure midpath elevations higher than 25,000 feet. At both ends of the path this difficulty disappears, as it is observed from Figure 2 and from Equation 9 that immediately above the transmitter or receiver an elevation of 3500 feet gives a path difference of about 3500 feet, which is easily measurable.

Under ordinary conditions, as shown in Figure 2, $p$ will be small with respect to 1 or 2, making it possible to simplify Equation 8 to the form:

$$y = D\sqrt{p[p - 2q^2 + 2q^2]} \qquad (12)$$

which, when $q=0$ or $q=1$ reduces to:

$$y = pD \qquad (13)$$

and, at $q=\frac{1}{2}$ becomes:

$$y = D\sqrt{\frac{p}{2}} \qquad (14)$$

These approximations are seen to give good accuracy, by comparison with Figure 2 and the foregoing table, which were, however, calculated by the use of the unsimplified Equations 8, 9, 10 and 11.

Now, in order to get a complete fix on the irregularity, it is necessary to introduce another independent variable, since the value of $p$ or $\delta$ merely fixes the particular ellipse along which the irregularity lies. This variable may, for example, be the angle of arrival, $\theta$. For, it is seen from Figure 1 that:

$$\tan \theta = \frac{y}{D-x} \tag{15}$$

or $$x = \frac{D \tan \theta - y}{\tan \theta} = D - \frac{y}{\tan \theta} \tag{16}$$

Substituting this expression in Equation 5, and simplifying, we obtain:

$$y = \frac{\delta(2D+\delta) \tan \theta}{2[D(\sec \theta - 1) + \delta \sec \theta]} \tag{17}$$

and substituting this result in (16) we arrive at the corresponding result for $x$:

$$x = D - \frac{\delta(2D+\delta)}{2[D(\sec \theta - 1) + \delta \sec \theta]} \tag{18}$$

It is seen that Equations 17 and 18 express $x$ and $y$ in terms of the parameters, $\delta$, and $\theta$, only. They accordingly could conceivably be used directly to produce the required presentation on the scope, by applying to the vertical deflecting elements a sweep voltage proportional to $y$, and a sweep voltage proportional to $x$ to the horizontal deflecting elements. This procedure would be facilitated by making certain simplifying assumptions. For it is to be observed that if the path difference, $\delta$ is small with respect to $2D$, and $\delta \sec \theta$ is small with respect to $D(\sec \theta - 1)$ Equation 17 reduces to:

$$y = \frac{\delta \tan \theta}{\sec \theta - 1} \tag{19}$$

and Equation 18 becomes:

$$x = D - \frac{\delta}{\sec \theta - 1} \tag{20}$$

which are quite easily manageable expressions.

However, an even simpler approach is afforded by taking advantage of ordinary P. P. I. techniques, in which the scanning takes place along a line making an angle with a reference axis equal to the angle of rotation of the antenna. Using this technique, we are interested, not in the individual values of the coordinates, but in the distance, $S_2$, from point B to the target. By combining Equations 3, 17 and 18, we obtain:

$$S_2 = \frac{\delta(2D+\delta)}{2[D(1-\cos \theta)+\delta]} \tag{21}$$

In turn, if we make the simplifying assumption that $\delta$ is small in comparison with $2D$, and with $D(1-\cos \theta)$ (21) reduces to:

$$S_2 = \frac{\delta}{1-\cos \theta} \tag{22}$$

an expression which can be easily used to control the sweep voltage along the scanning line.

*Instrumentation*

In practice, Equation 22 would be applied to the control of the scanning voltage in the following manner: We first convert the independent variable of (22) from a distance to a time base, by substituting the relation:

$$\delta = Ct \tag{23}$$

where $C$ is the velocity of light, and $t$ is the elapsed time between the reception of the direct wave and the reception of the reflected or refracted wave, to obtain:

$$S_2 = \frac{C}{1-\cos \theta} t \tag{24}$$

This equation expresses the distance from the receiver to the target in terms of the elapsed time. It is to be noted that the relationship is linear for any given value of the antenna elevation, $\theta$, but that it depends on this elevation. We now make the assumption that in order to present an undistorted display, the displacement, $S_s$, of the spot across the face of the scope should be proportional to the distance to the target, or:

$$S_s = k_1 S_2 = \frac{k_1 C}{1-\cos \theta} t \tag{25}$$

Then, the velocity of the spot across the face of the scope is:

$$\frac{dS_s}{dt} = \frac{k_1 C}{1-\cos \theta} \tag{25A}$$

We attain this exact velocity by superimposing a sweep voltage, $$E_s = k_2 S_2 \tag{26}$$

on the beam deflecting elements of the scope. Here, $k_2$ is a constant depending on the characteristics of the tube. Then, from (25), $$E_s = \frac{k_1 k_2 C}{1-\cos \theta} t \tag{27}$$

and the rate of change of sweep voltage is:

$$\frac{dE_s}{dt} = \frac{k_1 k_2 C}{1-\cos \theta} \tag{28}$$

As the elevation of the antenna changes, this rate of change of the sweep voltage is also varied by changing the time constants of the trigger circuits in accordance with information transmitted by well-known servo mechanisms associated with the antenna elevation axis. The intensity of the spot is modulated by the echo signal received from the target, and therefore, if such a signal is received at time $t$ it will be displayed as a bright spot displaced along the scanning line by a distance $k_1 S_2$, linearly proportional to the distance of the target, as required.

The value of $k_1$ is, of course, determined by the range required and the size of the scope. If, for example, we wish to have the total length of the scanning line represent a distance of $.5 \times 10^6$ feet (about 100 miles), and the scanning line is 4 inches, or .333 feet long, $k_1$ is $.666 \times 10^{-6}$. In existing available tubes, $k_2$ has a value in the vicinity of 70 volts per inch, or near 30 volts per centimeter, 3000 volts per meter. Substituting these values, together with the velocity of light, in Equation 28, we obtain, for the rate of change of sweep voltage:

$$\frac{dE_s}{dt} = \frac{.666 \times 10^{-6} \times 3000 \times 300 \times 10^6}{1-\cos \theta}$$

$$= \frac{.6 \times 10^6}{1-\cos \theta} \text{ volts per second} \tag{29}$$

This quantity will actually vary between wide limits, depending upon the antenna elevation. If we assume that the antenna will sweep between 3 degrees and 15 degrees, we find these limits to be:

At an elevation of 3 degrees ($\cos \theta = .99863$):

$$\frac{dE_s}{dt} = \frac{.6 \times 10^6}{.00137} = 438 \times 10^6 \text{ volts per second} \quad (30)$$

At an elevation of 15 degrees ($\cos \theta = .96593$):

$$\frac{dE_s}{dt} = \frac{.6 \times 10^6}{.03407} = 17.6 \times 10^6 \text{ volts per seconds} \quad (31)$$

Although these values look large, and the range appears to be extreme, we find, upon substituting the values of $k_1$ and $c$ in Equation 25A, that the sweep velocity in general is:

$$\frac{dS_s}{dt} = \frac{200}{1 - \cos \theta} \text{ meters per second} \quad (32)$$

which, at an elevation of 3 degrees, reduces to:

$$\frac{dS_s}{dt} = \frac{200}{.00137} = 146 \times 10^3 \text{ meters per second} = 14.6 \text{ centimeters per microsecond} \quad (33)$$

and, at an elevation of 15 degrees, becomes:

$$\frac{dS_s}{dt} = \frac{200}{.03407} = 5.87 \times 10^3 \text{ meters per second} = .587 \text{ centimeters per microsecond} \quad (34)$$

In the first case, therefore, one microsecond is represented by a spot displacement of 14.6 centimeters, and in the second case by a displacement of .587 centimeter. The second requirement is easily met, and on the basis of current progress in this field it appears that the first could also be achieved with careful design of the circuits and equipment.

In order to obtain a synchronizing pulse of constant amplitude and phase to start the sweep, it will probably be desirable to transmit this pulse over a separate channel, operated at a relatively low radio-frequency subject to comparatively low attenuation beyond the horizon. The system will therefore include such a low frequency channel, not necessarily of high power, which will be triggered by the transmitted pulse in order to provide at the receiver the required zero time reference.

*Appraisal of accuracy and feasibility*

An overall examination of the system as a whole indicates that the presentation accuracy which may be expected will depend on the following factors:

(1). The approximate range equation, (22) will introduce errors if $\delta$ becomes large enough to be comparable with $2D$ or with $D(1 - \cos \theta)$. This may be expected to occur as the range increases, so that at long ranges deterioration in the range accuracy may be anticipated.

(2). Low target elevations near mid path will result in values of $$\frac{dS_s}{dt}$$

which are so high as to be unattainable. There will therefore be minimum elevation values, below which targets cannot be seen, which will also depend on their $x$ coordinates. The range definition will deteriorate as this limit is approached.

(3). The receiving antenna pattern will affect the definition, particularly of objects at low elevation, and at a considerable distance. It may be expected that as the elevation decreases, the beam width of the antenna will become sufficiently large in comparison with the angle subtended by an object extended in a horizontal plane as to render the definition unsatisfactory.

(4). As the receiving antenna is elevated to obtain an indication of that part of an overlying layer which is closer to the receiver, the angle between the beam and the target surface will increase and at some value of antenna elevation this angle will become so large that reflections from the target will cease. This effect will establish a minimum range value inside which objects cannot be seen.

These considerations are examined quantitatively in Figures 3, 4, 5, and 6. In appraising these figures it must be remembered that radar presentations may be considerably distorted, and still provide useful information. A "B" scope presentation, for example, in which the angle of antenna rotation is presented along one coordinate and the range is shown on the other coordinate, embodies distortion which is so severe that objects at minimum range alongside the radar set appear to be at maximum range, and straight lines of constant range in the field of observation are presented on the scope as hyperbolae having extreme curvature. Nevertheless, "B" scope presentations were used extensively during the war, and were found to be very useful, as it developed that the operators of this equipment were able to adapt themselves to the distorted coordinates without difficulty. All radar equipment shares in common the disadvantage that definition deteriorates with increasing range, due to the finite width of the antenna pattern, which results in the equipment being responsive to a point source of echo energy over a considerable scanning angle, and accordingly causes small objects to appear several times their proper size on the scope. Where a number of such small objects exist in close juxtaposition at a considerable range, their images overlap, causing blurring and loss of definition. This is a fault which is inherent in the antenna pattern, independently of the type of radar system used, but despite its universal presence in radar equipment it has not constituted an important limitation to the usefulness of radar in general.

It appears that the above-mentioned disadvantages are no more important than they would be in the case of a conventional radar application. We are primarily interested in a qualitative examination of the assumed interfering irregularities, involving confirmation of their existence, and determination of their relative location and motion. If, over a certain portion of the range the definition is sufficiently good to enable us to ascertain their shape and size the objective has has been attained.

Figure 3:
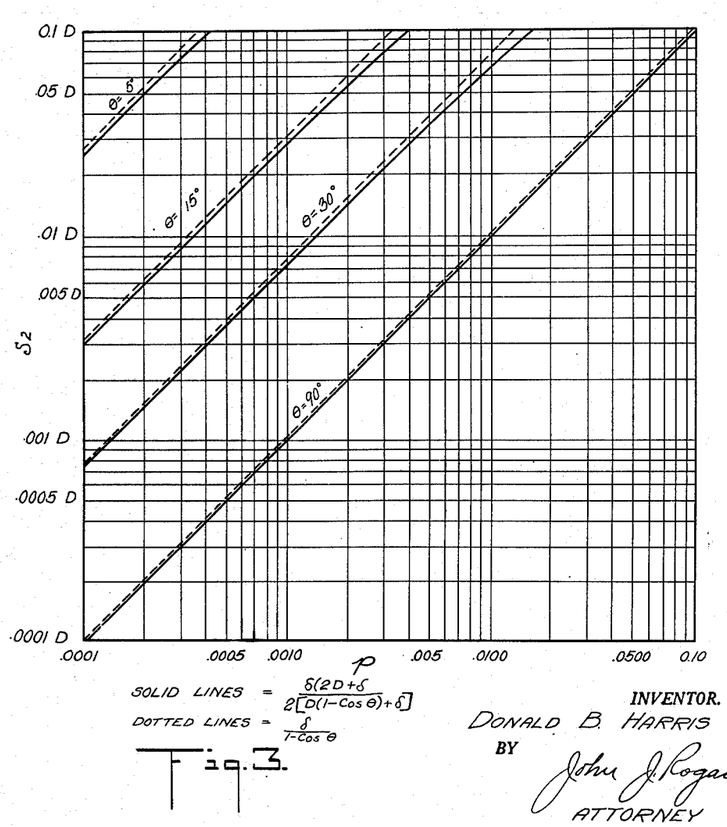
Fig. 3 is a series of graphs for different arrival angles of the received waves, wherein the solid lines represent a condition wherein $\delta$ is commensurate with D, and the dotted lines represent a condition wherein $\delta$ is small with respect to D.

Figure 3 shows the relation between the delay ratio, $p$, and the indicated range, $S_2$, employing both the exact range equation, (1), indicated by the solid curves, and the approximate range equation, (22), indicated by the dotted curves. This graph covers only the lower portion of the range curve, in which it appears that excellent accuracy can be obtained. It is to be noted that, as expected, as the range increases, the discrepancy between the approximation and the exact range equation becomes greater, for all values of antenna elevation angle, $\theta$. It is also noted that the discrepancy is greater for low antenna elevations than for high antenna elevations, as under these conditions $(1 - \cos \theta)$ is smaller. However, for all values shown in Figure 3, the accuracy is good, from a practical standpoint. It may therefore be concluded from Figure 3, that excellent results may be obtained, using the approximate range equation, out to range values of .1 D. or to 50,000 feet, assuming a base line of 500,000 feet and values of θ greater than 5'.

Figure 4:
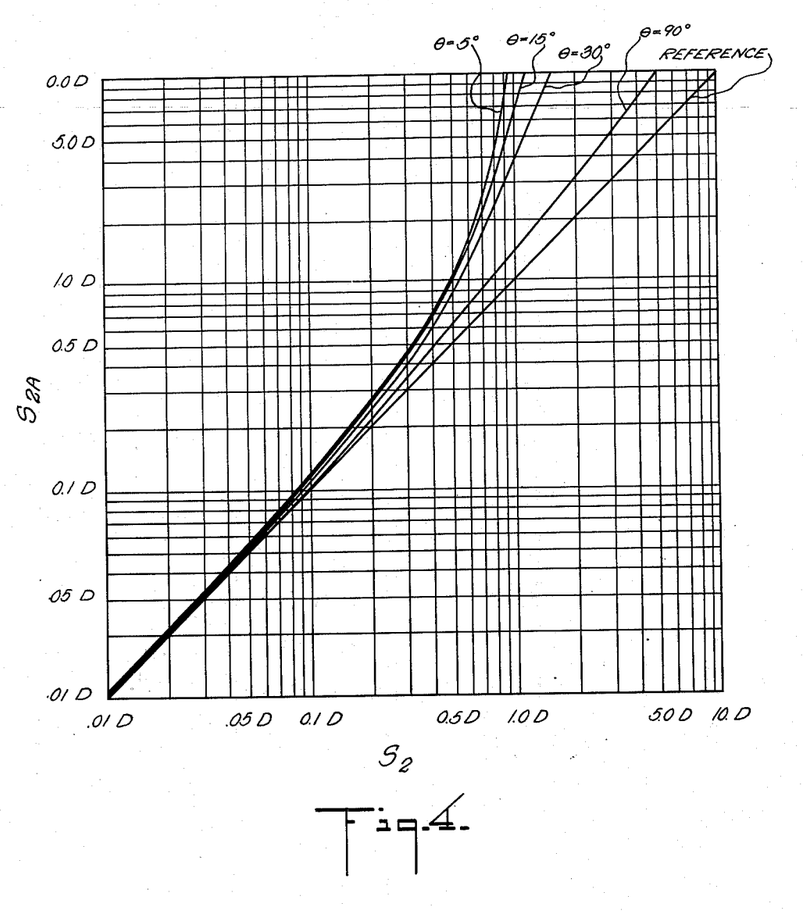
Fig. 4 is a series of graphs for different arrival angles showing the accuracy deviation as the arrival angle is varied with relation to the range.

The manner in which the approximate equation deviates from the exact equation at range values beyond 0.1 D is shown by Figure 4, in which the exact range value is plotted against the value given by the approximation for ranges as high as 10.0 D. It appears that for our purposes the discrepancy becomes unacceptable as the range exceeds 1.0 D, is probably tolerable between 1.0 D and 0.1 D, and as indicated by Figure 3, is negligible at a range of 0.1 D or below.

Figure 5:
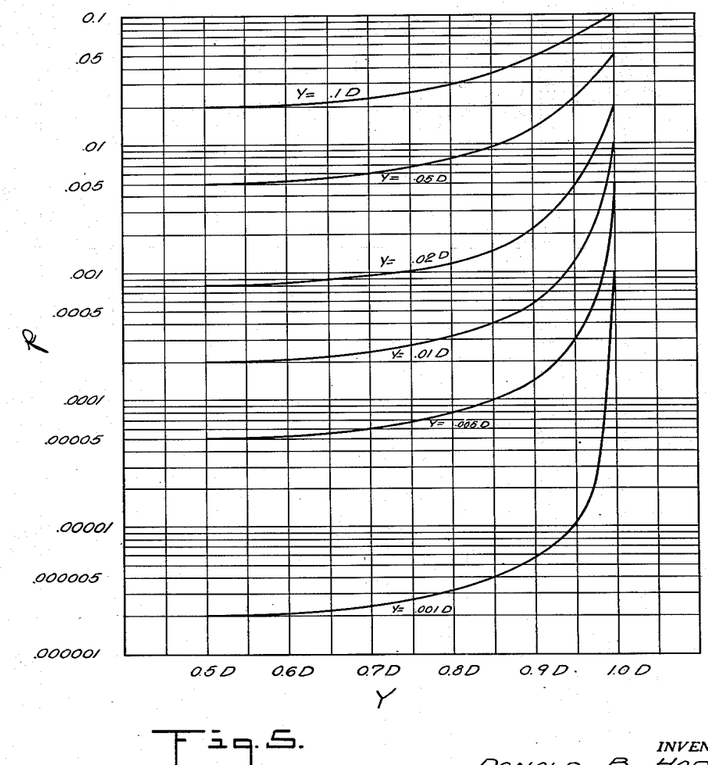
Fig. 5 is a series of graphs showing how the delay ratio $\delta/D$ is dependent upon the elevation and horizontal displacement of the target from the receiver.

Figure 5 shows the manner in which the delay ratio, $p$, is dependent on the elevation and horizontal displacement of the target. Each of the curves on this figure represents the response obtained from a layer extended in a horizontal plane at a constant elevation as marked on each curve. It is observed that in general the delay ratio of such a surface at constant elevation decreases toward the center of the path, where it is a minimum. Although not shown on the graph, the curve for the portion of the path between $x=0.0$ D and $x=0.5$ D is symmetrical, and the delay ratios in this region therefore again increase as the $x$ coordinate decreases toward 0. It is seen that for certain target elevations, the delay ratio becomes so small at the center of the path as to be practically undetectable with present day techniques. The bottom curve, for example, which represents, for a base line of 500,000 feet, an elevation of 500 feet, indicates a mid-path delay ratio, $p$, of $2.0 \times 10^{-6}$ corresponding to a difference of path of 1.0 foot, or .0010 microsecond, obviously unreadable. It is therefore evident without further investigation that we cannot expect to see irregularities lying at an altitude of 500 feet, except in the immediate vicinity of the receiving station. The remaining curves of Figure 5, however appear to give delay ratio values sufficiently high for practical application.

Figure 6:
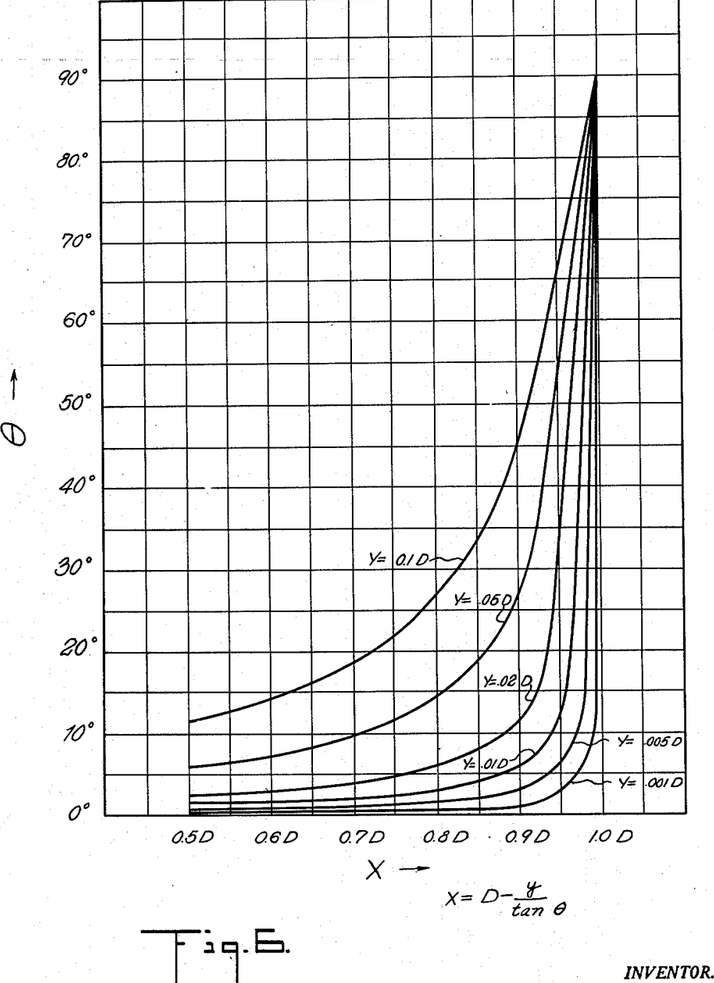
Fig. 6 is a series of graphs representing various horizontal distances along the propagation path for surfaces of uniform elevation.

In Figure 6, the angle of the antenna elevation, $\theta$, is plotted against the displacement along the propagation path, for various surfaces of constant elevation. This figure is based on the simple relationship of Equation 16 and shows that as the distance from the receiving station to the point of intersection with the surface of constant elevation increases the rate of change of $x$ with $\theta$ also changes markedly, to the extent that angular definition along the $x$ axis may ultimately be expected to be poor.

Using Figure 6, we can calculate the sweep velocities required and resolutions attainable at different points along the surface of constant elevation. In examining this matter, we are particularly interested in a surface at a constant elevation of 2,500 feet, since very limited information available at the present time indicates that the irregularities in question may actually lie at about this elevation. We observe, from Figure 6, reading the curve for $y=.005$ D, which if a base line of 500,000 feet be assumed represents a layer at this elevation, that the antenna elevation angle required in order to see that portion of the layer lying at a range of 50,000 feet is about 3 degrees. A calculation discloses that the exact value is 2.87 degrees. Figure 5 shows that at this same point the delay ratio, $p$, is .000138, corresponding to 69 feet or .0702 microsecond. The sweep velocity required at this antenna elevation angle is obtained from Equation 32 and is found to be 16.0 centimeters per microsecond.

The resolution realizable vertically and horizontally at a given range, as limited by the width of the antenna pattern, may be calculated from the equations:

$$\Delta x_A = \frac{S_2 \Delta \theta}{\sin \theta} \quad (35)$$

and $$\Delta y_A = S_2 \Delta \theta \cos \theta \quad (36)$$

where $\Delta x_A$ and $\Delta y_A$ are respectively the horizontal and vertical angular resolutions, $\Delta \theta$ is the beam width of the antenna, and $\theta$ and $\Delta \theta$ are expressed in radians. From these relations we find that the angular resolution at an elevation of 2500 feet, and a range of 50,000 feet along the X axis is 8,690 feet and along the Y axis is 436 feet, assuming a ½° beam width.

Although these resolutions do not appear to be optimum, they are no different from those which would be obtained from the same antenna used for conventional radar applications.

Similar relationships can be developed for the range resolution $\Delta S_{2R}$ depending on the change in $p$ or $\delta$ with increase in range. For, from the approximate range equation using a time base, $$S_2 = \frac{C}{1 - \cos \theta} t \quad (24)$$

we immediately obtain:

$$\Delta S_2 = \frac{C}{1 - \cos \theta} \Delta t \quad (37)$$

Now it is evident that in order to obtain resolution, the time interval, $\Delta t$ between echoes from consecutive objects along the scanning line, must be at least equal to the pulse length, T. Or $$\Delta S_{2R} = \frac{C}{1 - \cos \theta} T \quad (38)$$

This equation yields the result, that at an elevation of 2500 feet and a range of 50,000 feet, giving an antenna elevation angle of 2.87 degrees, the total range resolution along the scanning line is 7,868 feet, assuming a pulse length of 0.01 microsecond. Again, this does not appear to be good resolution, but it is no worse than that which is obtained with certain types of conventional radar equipment found satisfactory in practice. It is also noted that the range resolution is comparable in value with the X component of the angular resolution, so that with the P. P. I. system tentatively proposed the inaccuracies should be distributed about equally along the $S_2$ and X coordinates of the scope.

At lower antenna elevation angles, representing objects at a greater distance along the 2500 foot constant elevation surface, both the angular and the range resolution will of course deteriorate, due to the greater linear width of the beam, and the increase in the coefficient of Equation 38 as the angle of elevation becomes smaller. The sweep velocity will also increase to a value attainable only with the greatest difficulty. It may be expected, therefore, that the definition at the center of the path will be poor, and it may be necessary to accept sweep velocities lower than optimum with resultant distortion; but with careful design it is possible to detect the existence of objects at this location, though probably without determining their size or shape.

On the other hand, as the range decreases, the definition improves greatly, and the sweep velocity decreases to a point where it can easily be obtained without special expedients. For example, at a horizontal distance of 9310 feet (0.018 D) from the receiving site, Figure 6 shows that the antenna elevation for a target elevation of 2500 feet is about 15 degrees. At this antenna elevation, Equation 32 shows that the sweep velocity is 0.587 centimeter per microsecond, Figure 5 shows that the delay ratio is about 0.00110, Equations 35 and 36 give angular horizontal and vertical resolutions of about 340 feet and 85 feet respectively, and Equation 38 yields a range resolution of about 290 feet.

With regard to the minimum range at which irregularities are observable, no data are available as to the maximum angle between the beam and the surface of the irregularity, beyond which the irregularity ceases to reflect or refract the beam. It seems safe to assume however, that reflections will continue to be obtained up to an angle of arrival of 15 degrees. It should therefore be possible to see irregularities lying at an elevation of 2500 feet at horizontal distances from the receiving site not less than 9310 feet.

This discussion of irregularities at minimum altitudes represents, of course, the worst condition. Irregularities lying at higher elevations will be readily detectable with improved definition and the system should definitely be very effective in studying "ghosts" and other irregularities reported from time to time as lying at elevations in excess of 10,000 feet.

Summarizing the foregoing, it is indicated that it should be possible, using the system according to the invention, with a base line of 500,000 feet, to obtain valuable data regarding the nature of irregularities causing anomalous propagation phenomena, providing that the irregularities lie at elevations in excess of a certain height, for example 2500 feet. That portion of a hypothetical layer of irregularities at an elevation of 2500 feet which extends along the propagation path between distances of 0.1 D, 50,000 feet, 9.48 miles and .018 D, 9310 feet, 1.76 miles, from the receiving site, should be presented with sufficiently good definition to permit detailed study. In order to achieve this result, it will be necessary to use equipment capable of detecting and displaying path differences as small as 69 feet, and time intervals as small as .07 microsecond, leading to the conclusion that a pulse length not greater than $.01 \times 10^{-6}$ seconds is required. A receiving antenna pattern one-half degree wide is required. Irregularities lying at higher elevations can be displayed with less difficulty and with improved definition.

The foregoing analysis has, of course, been confined to matters affecting the immediate objective, which is the application of the invention to propagation studies. Many of the limitations controlling in the case of propagation applications would no longer be of importance if a system were to be designed for the purpose of tracing high-flying aircraft. For such applications, the difference in path might be expected to be large under all conditions, making it possible to employ much longer pulse lengths; and on account of the larger antenna elevation angles, the definition might be expected to be satisfactory with relatively wide receiving antenna patterns. If such applications were to be made, however, it would be desirable ultimately, to employ the exact range equation, (21), rather than the approximation, (22), in order to eliminate the distortion caused by the approximate relation at long ranges. This could undoubtedly be done by introducing into the sweep circuit elements adapted to change the slope of the sweep voltage curve as it proceeds through the sweep cycle, in order to recognize the non-linear relation between the range, $S_2$ and the path difference, $\delta$, or the elapsed time, $t$.

Figure 7:
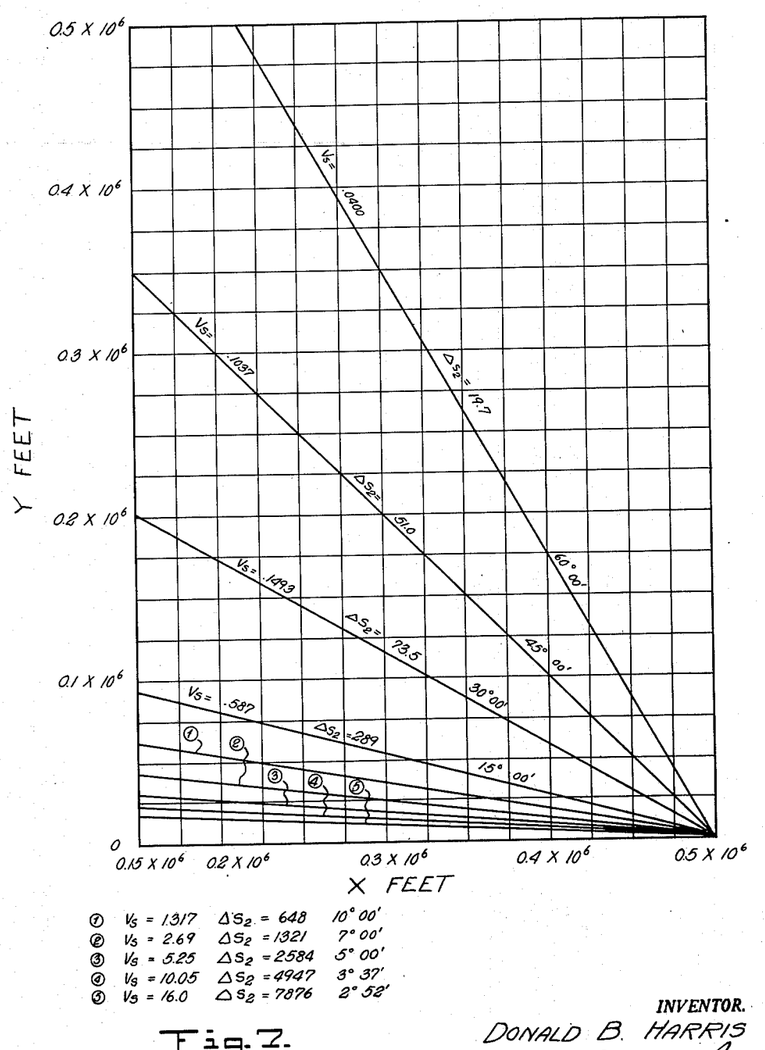
Fig. 7 is a series of graphs useful in connection with the design of an oscilloscope indicator showing a constant sweep velocity and constant range resolution for various arrival angles at the receiver and with a fixed distance of approximately 500,000 feet between the transmitter and receiver, represented by an oscilloscope scanning line of four inches.

Figure 7 provides, for purposes of example, an over-all graphical summary of the specific propagation application proposed, involving a base line of 500,000 feet. In this figure the elevation, $y$, in feet, is plotted against the horizontal coordinate, $x$, of the target, in feet, measured from the transmitter, for various constant values of the sweep velocity $$\frac{dS_s}{dt}$$

here designated as $V_s$, expressed in centimeters per microsecond, and of the resolution $\Delta S_{2R}$, in feet. This figure is based on the approximate sweep velocity and resolution equations, (25A) and (38) and assumes that $k_1$ is $.666 \times 10^{-6}$, the entire base line of 500,000 feet being represented on a scanning line 4 inches long. The sweep velocity required and the resolution obtainable in viewing a target located at any point in the field of observation may be found by determining the coordinates of the target, entering them on the graph, and interpolating between the adjacent lines of constant sweep velocity and resolution, which are, of course, the lines along which the equipment scans at the antenna elevations indicated. For example, the point, $x=250,000$ feet, $y=12,500$ feet, is seen to lie on the line elevated $2°\ 52'$ from the horizontal, along which scanning takes place at a velocity of 16.0 centimeters per microsecond, with a resolution of 7876 feet. Another point at this same elevation, 12,500 feet, but with an $x$ coordinate of 400,000 feet is on the other hand viewed along a scanning line elevated $7°\ 0'$ with a sweep velocity of about 2.69 centimeters per microsecond and a resolution of about 1,321 feet.

Figure 8:
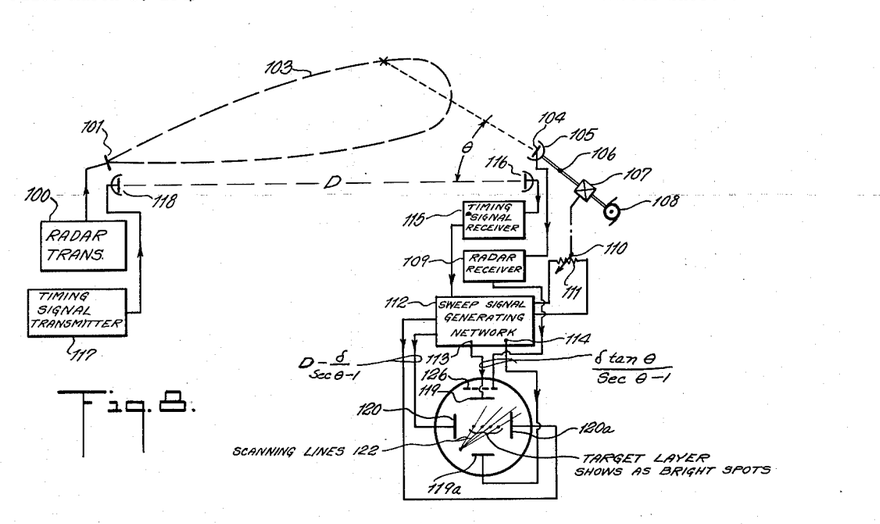
Fig. 8 is a schematic block and wiring diagram of one organization of apparatus according to the invention.

Referring to Fig. 8, there is shown, in schematic form, an organization of apparatus that involves a cathode-ray tube oscilloscope which is controlled by coordinate beam deflection voltages in accordance with Equations 19 and 20 hereinabove explained. The block 100 represents any well-known radar transmitter which is capable of transmitting pulsed high frequency energy. For a detailed description of a typical transmitter, reference may be had to Chapter VIII, pages 103 to 106 of "Principles of Radar," second edition, by M. I. T. Radar School Staff, published by McGraw-Hill Book Company, Inc., New York and London, 1946. The transmitter feeds a suitable antenna 101, for example a half-wave dipole or a dipole array for producing a radio beam 103 which has a field that covers the entire region of space to be investigated. For a detailed description of such an antenna, reference may be had to "Principles of Radar" referred to above, Chapter IX, pages 3 to 14.

Located at a remote point, approximately 100 miles from the antenna 101, is a radar receiving antenna 104 which also has a reflector 105 of any known construction to render the antenna highly directional in response, and for example as described in pages 9-3 to 9-14 of "Principles of Radar." The antenna 104 is provided with a suitable mounting whereby its direction of elevation can be varied at any desired rate. Thus the antenna support can be pivotally mounted at 106 which may represent a horizontal axis, and the support can be connected through suitable gearing 107 to a reversible electric motor 108.

Fed from the antenna 104 is any well-known radio receiver 109, such as is used in radar systems and as described for example in pages 8–103 to 8–106 of "Principles of Radar." The antenna is also mechanically coupled to a member 110 which is associated with one or more electrically adjustable circuit elements represented schematically by the resistance 111. These elements are connected to a network 112 which is designed to produce at its output terminals 113 and 114 a voltage represented by the function $$\frac{\delta \tan \theta}{\sec \theta - 1}$$

where $\theta$ is the angle of elevation of the receiving antenna, and $\delta$ is the delay factor described hereinabove. For a detailed disclosure of the design of such a network, reference may be had to the said "Principles of Radar," pages 3–12 to 3–55, or if desired an angle function resolver such as shown in U. S. Patents Nos. 2,465,624 and 2,467,646, may be employed.

The network 112 is also fed by another radio receiver 115 which responds to the signals picked up by an antenna 116 in order to start the sweep circuit. Antenna 116 is preferably highly directional and is adapted to receive in a direct line suitable time base signals which are transmitted by another time base signal transmitter 117 and directional antenna 118 located adjacent the antenna 101. If desired, the transmitter 100 can also be used to generate this time base signal. There is also produced at the output of network 112 another voltage according to the function $$D - \frac{\delta}{\sec \theta - 1}$$

The two voltages mentioned can then be applied respectively to the vertical and horizontal deflector plates 119 and the horizontal deflector plates 120 of any well-known cathode-ray tube oscilloscope 121. The signal picked up by antenna 104 and detected by receiver 109 is applied to an intensity control grid 126, in order to produce a bright spot on the scope at the range of the target. There will thus be produced upon the screen of the oscilloscope an indication as illustrated by the dotted lines 122 in Fig. 8 which identify the range of elevation of the various targets that are picked up during the rotation of the antenna 105. In practice, a direct current bias voltage is applied to plates 119a and 120, in addition to the coordinate voltages, in order to center the scanning lines in one corner of the field.

Figure 9:
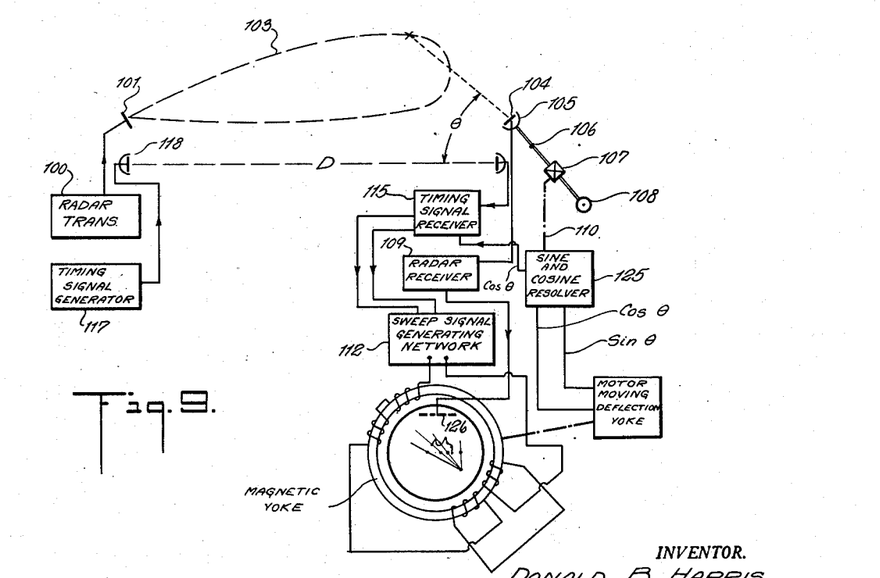
Fig. 9 is a schematic block and wiring diagram of a modification of Fig. 8.

Fig. 9 shows how the system of Fig. 8 can be used to produce the conventional P. P. I. display. In this embodiment the antenna mounting is connected to any well-known resolver device 125 which produces two output signals corresponding respectively to the sine and cosine of the angle of elevation of the antenna 104. These sine and cosine voltages are then applied to control the mechanical angle of rotation of the magnetic deflection yoke of the oscilloscope to produce the usual polar sweep which is well-known in P. P. I. indicators, and as described for example in Chapter III, pages 53 to 55, in "Principles of Radar." The signal picked up by the antenna 104 and detected by the receiver 109 is then applied to an intensity control grid 126 of the cathode-ray tube oscilloscope with the result that there are produced successive bright spots on the screen of the oscilloscope whose distance from the reference center 127 represents the range of the target, and whose angular orientation around the point 127 represents the elevation of the target. For this purpose, the magnetic deflection yoke has applied thereto a sweep voltage $$\frac{k_1 k_2 C}{1 - \cos \theta} t$$

as described above in connection with Equation 27.

It will be understood, of course, that the invention is not limited to the use of cathode-ray tube oscilloscopes for producing the indication. Any other well-known form of display device may be used, so long as it is controlled by a voltage which is a function of the angle of elevation of the receiving antenna and the delay factor $\delta$ corresponding to the particular ellipsoidal locus of points having the same delay factor but at different elevations, as described hereinabove.

What is claimed is:

1. The method of detecting the range and direction of a target located at an unknown position in a wave-propagation medium, which comprises, transmitting from a transmitting point a pulsed beam of high frequency radio waves through said medium to a remotely-located receiving point over a reflection path from the target, receiving said waves at the receiving point over an adjustable azimuthal angle of reception, simultaneously transmitting timing pulses over a direct path from the transmitting point to the receiving point, adjusting said azimuthal angle to produce at the receiving point an electric signal which is controlled by $$\frac{\delta}{D}$$

and the arrival angle of the reflected waves at the receiving point, wherein "$\delta$" is the difference in physical length between the direct path from the transmitting point to the receiving point and the reflected or refracted path from the transmitting point to the receiving point, and "D" is the physical length of the direct path from the transmitting point to the receiving point, and applying said signal at the receiving point to produce an indication representing the said range and direction.

2. The method of detecting the range and direction of a target located at an unknown position in a wave-propagating medium, which comprises, transmitting from a transmitting point a pulsed beam of high frequency radio waves through said medium to a remotely-located receiving point after reflection from the target, receiving said waves at the receiving point over an adjustable azimuthal angle of reception simultaneously transmitting timing pulses over a direct path between the transmitting and receiving points, adjusting said azimuthal angle to produce at the receiving point an electric signal which is controlled by the difference in physical length between the direct path from the transmitting point to the receiving point and the physical length of the reflection path from the transmitting point to the receiving point, said signal also being controlled in accordance with the versine of the angle of arrival of the reflected waves at the receiving point, and applying said signal at the receiving point to produce an indication representing the said range and direction.

3. The method of detecting the range and direction of a target located at an unknown position in a wave-propagating medium, which comprises, transmitting from a transmitting point to a remotely-located receiving point and through said medium after reflection from the target a pulsed beam of high frequency radio waves, simultaneously transmitting timing pulses over a direct path between the transmitting and receiving points, adjustably and directionally receiving the reflected waves at said receiving point, adjusting the azimuthal directional receiving angle at the receiving point to scan regions of said medium having the same delay factor $$\frac{\delta}{D}$$

between the direct and reflected wave paths between the said two points, and producing at the receiving point an indication which is controlled by said delay factor $$\frac{\delta}{D}$$

and also by the arrival angle of the waves at the receiving point, wherein "δ" is the difference in physical length between the direct and reflected paths between said two points, and "D" is the physical length of the direct path between said two points.

4. The method of detecting the range and direction of a target located in a region of space at an unknown position, which comprises, transmitting through said region from a transmitting point to a remotely-located receiving point by way of reflection from the target a pulsed radar beam, simultaneously transmitting timing pulses directly from the transmitting point to the receiving point, directionally receiving the said waves at the receiving point over an adjustable azimuthal arrival angle comparing the time of arrival of the reflected pulses with the direct pulses to derive a voltage controlled by the delay factor $$\frac{\delta}{D}$$

adjusting the angle of elevational directivity at the receiving point, deriving another voltage from said elevational angle, and combining said voltages to produce a composite signal which represents the said range and direction, wherein "δ" in the delay factor is the difference in physical length between the direct and reflected paths, and wherein "D" in the delay factor is the physical length of the direct path.

5. The method of forward radar, which comprises, locating a radar transmitter and a radar receiver at widely-spaced points with the physical spacing of the same order as the target reflected path between the transmitter and receiver, transmitting a pulsed radar beam through regions of space to be examined, simultaneously transmitting timing pulses between the transmitter and receiver, adjusting the elevational angle of receptional directivity at the receiver between predetermined limits to scan successively elevated regions of space having the same delay factor for target-reflected waves, and producing a composite signal which is controlled by the said elevational angle and the delay factor $$\frac{\delta}{D}$$

corresponding thereto, wherein "δ" is the difference in physical length between the direct path and the reflected path, and "D" is the physical length of the direct path.

6. The method according to claim 5, in which the said elevational angle is adjusted between approximately three degrees and fifteen degrees.

7. The method according to claim 5, in which said transmitter and receiver are located sufficiently far apart to produce delay factors $$\frac{\delta}{D}$$

between .0500 and .0001.

8. The method according to claim 5, in which the distance between the transmitter and receiver is chosen so that the included angle between the wave path to the target and the wave path reflected from the target is more than forty-five degrees.

9. The method of forward radar, which comprises, transmitting pulsed radar waves from a radar transmitter to a remotely-located radar receiver with the physical separation between the transmitter and receiver of the same order of length as the reflection path between the transmitter and receiver by way of reflection from a target at an unknown position, simultaneously transmitting timing pulses over a direct path between the transmitter and receiver, adjusting the directional receiving angle at the receiver, comparing the time of arrival of the waves over a direct path with the time of arrival of the reflected waves, and producing under control of said comparison and under control of the angle of the wave arrival at the receiver a signal representing the spacial coordinates of the target from which the waves are reflected.

10. The method of measuring the range and direction of a target located at an unknown position in a wave-propagating medium, which comprises, transmitting from a transmitting point through said medium for reflection from the target a beam of pulsed high frequency radio waves, simultaneously transmitting timing pulses from said transmitting point over a direct path, receiving the reflected waves at a directionally-sensitive receiving station located at a point remote from the transmitter, adjusting the elevational directional angle of the receiving station to scan regions of said medium having the same delay-factor $$\frac{\delta}{D}$$

between direct and echo waves propagated from the transmitter to the receiver, producing under control of said delay-factor and the said elevational angle two signals representing respectively the $x$ and $y$ spacial coordinates of the target, one of said signals being approximately according to the relation $$y = \frac{\delta(2D+\delta)\tan\theta}{2[D(\sec\theta-1)+\delta\sec\theta]}$$

and the other signal being approximately according to the relation $$x = D - \frac{\delta(2D+\delta)}{2[D(\sec\theta-1)+\delta\sec\theta]}$$

wherein "δ" is the difference in physical length between the direct path and the reflected path, "D" is the physical length of the direct path, and "$x$" and "$y$" are respectively the horizontal and vertical coordinates of the target, and "θ" is the said elevational angle.

11. The method of measuring the range and direction of a target located at an unknown position in a wave-propagating medium, which comprises, transmitting from a transmitting point through said medium for reflection from the target a pulsed beam of high frequency radio waves, simultaneously transmitting timing pulses over a direct path from said transmitting point, receiving the reflected waves at a directionally-sensitive receiving station located at a point remote from the transmitter, adjusting the elevational directional angle of the receiving station to scan regions of said medium having the same delay-factor $$\frac{\delta}{D}$$

between direct and echo waves propagated from the transmitter to the receiver, producing under control of said delay-factor and the said elevational angle two signals representing respectively the $x$ and $y$ spacial coordinates of the target, one of said signals being approximately according to the relation $$y = \frac{\delta \tan \theta}{\sec \theta - 1}$$

and the other signal being approximately according to the relation $$x = D - \frac{\delta}{\sec \theta - 1}$$

wherein "$\delta$" is the difference in physical length between the direct path and the reflected path, "$D$" is the physical length of the direct path, "$x$" and "$y$" are respectively the horizontal and vertical coordinates of the target, and "$\theta$" is the said elevational angle.

12. The method of measuring the range and direction of a target located at an unknown position in a region of space, which comprises, transmitting from a transmitting point a pulsed radar beam through said region, locating a radar receiver at a point remote from the transmitting point to respond to the waves reflected from said target, simultaneously transmitting timing pulses from the transmitting point to the receiver over a direct path therebetween, comparing the time of arrival of said reflected waves with waves transmitted directly to the receiving point to determine the delay-factor $$\frac{\delta}{D}$$

wherein "$\delta$" is the difference in physical length between the direct and reflected paths, and "$D$" is the physical length of the direct path, adjusting the angle $\theta$ of elevational directivity at the receiving point, and deriving a voltage $$\frac{\delta}{1 - \cos \theta}$$

to represent the distance between the target and the receiver, and another voltage representing the said elevational angle, and combining said voltages to produce a composite signal representing said range and distance.

13. Apparatus for detecting the range and direction of a target located at an unknown position in a wave-propagating medium, comprising a radio transmitter for transmitting pulsed waves from a transmitting point to the target and thence by reflection to a remotely located receiving point, a cooperating radio receiver located at said receiving point and having adjustable antenna means to select any desired respective wave arrival angle, means to transmit simultaneously timing pulses over a direct path between the transmitter and the receiver, and means controlled by said receiver and the angular orientation of said antenna to produce an indication which is determined by the difference in physical length of the direct and echo paths from the transmitter to the receiver, and by the angle of the reflected wave arrival at the receiver corresponding to the angular setting of said antenna.

14. Apparatus for detecting the range and direction of a target located in a wave-propagating medium at an unknown position, comprising a radio transmitter for transmitting pulsed waves to the target and thence by reflection to a remotely located receiving point, a cooperating radio receiver located at the receiving point having adjustable antenna means to select any desired reflected wave arrival angle, means to transmit simultaneously timing pulses over a direct path between the transmitter and receiver, and means controlled by the receiver to produce an indication determined by the difference in physical length of the direct and echo paths from the transmitter to the receiver and also by the versine of the angle of reflected wave arrival at the receiver corresponding to the angular setting of said antenna.

15. Apparatus for detecting the range and direction of a target located in a wave-propagating medium at an unknown position, comprising a radio transmitter for transmitting pulsed waves to the target and thence by reflection to a remotely located receiving point, a cooperating radio receiver located at said receiving point having a directionally adjustable antenna whose elevation is adjustable to select any desired reflected wave arrival angle, and means controlled by said receiver to produce an indication corresponding to the difference in length of the direct and echo paths from transmitter to receiver and also by the selected elevational angle of said antenna.

16. Apparatus for detecting the range and direction of a target located in a wave-propagating medium at an unknown position, comprising a radar beam transmitter for transmitting pulsed waves to the target and thence by reflection to a remotely-located receiving point, a cooperating radar receiver located at a point remote from the transmitter to respond to waves reflected from said target, said transmitter and receiver being physically spaced a distance of the same order as the physical length of the reflection path between transmitter and receiver by way of the target, means to simultaneously transmit timing pulses over a direct path between the transmitter and receiver, means at the receiver to compare the time of arrival of said reflected waves with waves transmitted directly to the receiver to derive a voltage proportioned to a delay-factor $$\frac{\delta}{D}$$

wherein $\delta$ is the difference in length between the direct and reflected paths, and $D$ is the length of the direct path, an angularly-adjustable antenna for said receiver, means to adjust the elevational angle of said antenna, means to derive another voltage corresponding to said elevational angle, and means to combine said voltages to produce a composite signal representing the said range and direction.

17. Apparatus for measuring the range and direction of a target located in a wave-propagating medium at an unknown position, comprising a radar transmitter, a cooperating radar receiver, said receiver being located at a remote point from the transmitter so that the delay factor $$\frac{\delta}{D}$$

is not substantially less than .0001, wherein $\delta$ is the difference in length between the direct and reflected paths, and $D$ is the length of the direct path, means to transmit into said region a radar beam at a grazing angle with respect to the target, a directionally-sensitive and angularly adjustable antenna for the receiver, means to adjust the elevational angle of said antenna between approximately three degrees and fifteen degrees, and means to produce a visual indication of the said range and distance, the last-mentioned means including apparatus for producing control voltages proportional to said elevational angle and proportional to said delay-factor $$\frac{\delta}{D}$$

18. Apparatus according to claim 17, in which the last-mentioned means includes a network for producing a control voltage representing approximately the versine of said elevational angle.

19. Apparatus according to claim 17, in which the last-mentioned means includes a device which is controlled by the elevational angle of said antenna to produce a voltage which is proportional approximately to the versine of said elevational angle.

20. Apparatus according to claim 17, in which the last-mentioned means includes an oscilloscope having coordinate deflection control elements, and means to apply said control voltages at regularly recurrent rates to said deflection control elements to produce a persisting visual indication of said range and distance.

DONALD B. HARRIS.

References Cited in the file of this patent

UNITED STATES PATENTS

| Number | Name | Date |
|---|---|---|
| 1,981,884 | Taylor et al. | Nov. 27, 1934 |
| 2,399,017 | Goldman | Apr. 23, 1946 |
| 2,408,048 | Deloraine | Sept. 24, 1946 |
| 2,409,448 | Rost | Oct. 15, 1946 |
| 2,420,408 | Behn | May 13, 1947 |
| 2,463,476 | Busignies | Mar. 1, 1949 |
| 2,535,038 | Busignies | Dec. 26, 1950 |